United States Patent [19]

Hoyer et al.

[11] Patent Number: 4,763,479
[45] Date of Patent: Aug. 16, 1988

[54] METHOD FOR THE PRODUCTION OF USEABLE STEAM AND NON-TOXIC SOLIDS FROM GEOTHERMAL BRINE

[75] Inventors: Daniel P. Hoyer, Palm Desert; John L. Featherstone, El Centro; Morton M. Wong, Placentia, all of Calif.

[73] Assignee: Union Oil Co. of California, Los Angeles, Calif.

[21] Appl. No.: 947,040

[22] Filed: Dec. 29, 1986

[51] Int. Cl.$^4$ ............................................. F03G 7/00
[52] U.S. Cl. ................................... 60/641.5; 210/747
[58] Field of Search .................. 60/641.5, 641.2, 641.3, 60/641.4; 210/747

[56] References Cited

U.S. PATENT DOCUMENTS

| | | | |
|---|---|---|---|
| 3,782,468 | 1/1974 | Kuwada | 166/267 |
| 3,893,299 | 7/1975 | Hutchinson | 60/641 |
| 3,953,972 | 5/1976 | Awerbuch | 60/641 |
| 3,958,635 | 5/1976 | Zilch | 166/244 |
| 3,975,912 | 8/1976 | Greene | 60/641 |
| 4,016,075 | 4/1977 | Wilkins | 210/42 R |
| 4,032,460 | 6/1977 | Zilch | 252/8 |
| 4,113,504 | 9/1978 | Chen | 106/97 |
| 4,123,506 | 10/1978 | Spevack | 423/566 |
| 4,132,075 | 1/1979 | Fleck | 60/641 |
| 4,138,851 | 2/1979 | Rogers | 60/641 |
| 4,224,151 | 9/1980 | Jost | 210/696 |
| 4,302,328 | 11/1981 | Van Note | 210/714 |
| 4,370,858 | 2/1983 | Awerbuch | 60/641.5 |
| 4,405,463 | 9/1983 | Jost | 210/712 |
| 4,429,535 | 2/1984 | Featherstone | 60/641.5 |
| 4,522,728 | 6/1985 | Gallup et al. | 60/641.5 X |

OTHER PUBLICATIONS

Tardiff, G. E., "Using Salton Sea Geothermal Brines for Electrical Power"—Lawrence Livermore Laboratory UCRL-79468, 5-31-77.
Hornburg, C. D., "Geothermal Development of the Salton Sea EEP Jul., 1977, pp. 89-93.
Berthold, "Process Technology for Recovering Geothermal Brine Minerals" NTIS PB-241 867, Feb., 1975.

Primary Examiner—Allen M. Ostrager
Attorney, Agent, or Firm—Walter A. Hackler

[57] ABSTRACT

A method is provided for producing power from geothermal brine comprising dissolved toxic elements without significant precipitation of toxic solids. When sludge produced by the process is washed, non-toxic solids are produced which can be disposed or utilized in an environmentally acceptable manner. The method includes removing geothermal brine, separating non-condensable gases therefrom, and handling the non-condensable gases separate from the processing of the non-condensable gas-free brine to prevent reaction therebetween. An air-free flashed brine handling system is established to prevent contact of air with the flashed brine, and all brine contacted with air including condensate from steam turbines producing electrical power is injected into the aquifer from which the geothermal brine was extracted through the use of separate injection wells. Total isolation of non-aerated brine and aerated brine, removal of non-condensable gases, and washing of sludge produced results in a non-toxic sludge in accordance with governmentally accepted standards.

16 Claims, 2 Drawing Sheets

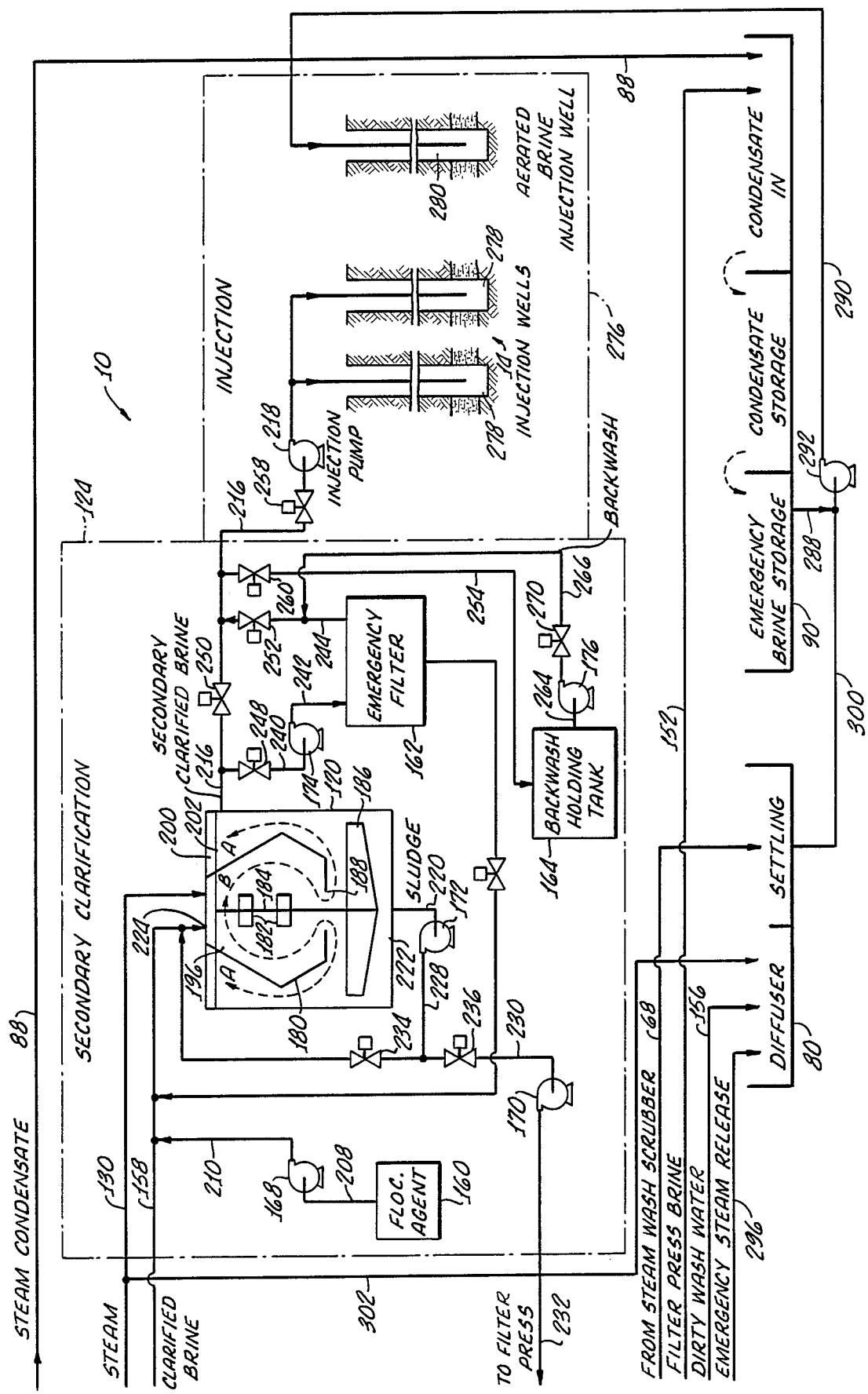

METHOD FOR THE PRODUCTION OF USEABLE STEAM AND NON-TOXIC SOLIDS FROM GEOTHERMAL BRINE

BACKGROUND OF THE INVENTION

1. Field of the Invention

The present invention relates generally to the production of electrical power using geothermal fluids and, more particularly, to a method for the production of useable steam and non-toxic solids from geothermal brine. The steam may be used for the production of electrical power through steam turbines, or the like, and the non-toxic solids are suitable for beneficial use in an environmentally acceptable manner.

2. Discussion of the Prior Art

Generally speaking, heat from the earth is an inexhaustible resource. The great majority of this heat is unavailable except in those instances where the hot magma from the earth's interior has come in contact with water, which often produces surface manifestations, such as hot springs and geysers. Geothermal brine, at temperatures of over about 500° F., may be withdrawn from large subterranean aquifers which have been found in many areas of the world. Unfortunately, such brine is not inherently pollution-free. In fact, the utilization of such brine for power generation may produce adverse environmental impacts in view of the present environmental standards.

Brine and steam from naturally occurring geyser activity has given enjoyment to mankind since antiquity and, over the years, extraction wells drilled into the earth's surface to intercept the subterranean aquifers have produced a steady, dependable supply of hot pressurized brine to the earth's surface. Brine removed from the aquifers is flashed into useable steam leaving a spent brine having a super-saturated amount of solids therein, which subsequently precipitate to form a sludge.

Although the hereinabove-recited principal of extracting steam from geothermal brine is easily stated, its implementation is not without adverse environmental impact. In fact, the environmental considerations frequently prevent economical production of electrical power. Most of the environmental impact problems are associated with the composition of the geothermal brine. As hereinbefore noted, geothermal brines may have temperatures over about 500° F., with pressures in the range of between about 400 to about 500 psig. At these temperatures and pressures, the geothermal brine easily leaches large quantities of salts, minerals and elements from the aquifer formation. As is well known, brine compositions vary from aquifer to aquifer, but typically contain high levels of dissolved silica, dissolved gases as well as dissolved toxic solids comprising, for example, antimony, arsenic, copper, lead and zinc, the toxic solids being most objectionable from an environmental impact point of view. As may be expected, flashing of the geothermal brine causes a supersaturated concentration of silica and dissolved toxic solids which can precipitate from the brine.

Without preventative measures, the impurities typically precipitate as a tough scale throughout the process equipment, including the reinjection wells for pumping the spent brine back into the aquifer for replenishment. Experience has shown that in high pressure, brine-flashing vessels, heavy metal sulfide and silicate scaling is the most severe problem, while in the comparatively low temperature atmospheric flashing portions of the system the scaling usually comprises silica and hydrated ferric oxide.

Disposal of spent brine is accomplished by injection, or pumping, of the spent brine down a nonproducing well into the aquifer. The motive for this procedure is to prevent contaminants in the brine from entering the environment and to return unusable enthalpy and mass to the reservoir, thus reducing thermal pollution and perhaps prolonging the reservoir lifetime. Unfortunately, the precipitated contaminants in the spent brine may eliminate or drastically reduce the permeability of the formation surrounding the injection well. Ultimately, this procedure might destroy the overall permeability of the aquifer. Hence, such precipitated solids must be removed from the spent brine before injection thereof in order to maintain the aquifer integrity and prevent blocking of the injection well itself, which may cause costly abandonment thereof or reconditioning in order to rejuvenate its functionality.

A considerable amount of effort has been directed toward developing effective processes for removing solids from the spent brine while at the same time eliminating or at least very substantially reducing silica scaling in the flashed geothermal brine handling systems. For example, U.S. Pat. No. 4,439,535 to Featherstone, et al, discloses the induced precipitation of scale-forming materials, principally silica, from the brine in the flashing stage by contacting the flashed brine with silica or silica-rich seed crystals. This procedure induces silica, precipitating from solution, to deposit onto the seed crystals rather than on equipment surfaces. Because the seed crystals provide a relatively large surface area for receiving precipitated silica compared to exposed surfaces of the flashing vessels and equipment, a majority of the precipitated silica is captured by the seed crystals and prevented from combining as a hard scale on interior equipment surfaces.

Unfortunately, seeding to capture precipitating silica as well as other solids from the flashed brine results in an increased amount of suspended solids which cannot be effectively disposed of by injection thereof. As hereinbefore noted, the suspended solids include heavy metal elements and compounds which may be toxic and must be treated as hazardous wastes if they are present in amounts greater than that defined by environmental standards.

In a typical geothermal brine power plant, suspended solids are settled from the spent brine in a clarifier. The clarifier separates or concentrates the precipitated solids into a sludge and a clarified brine overflow having a relatively small amount of suspended solids. The clarifier also produces the seed material useable for capturing precipitating solids as hereinbefore described. In this procedure a portion of the silica precipitate sludge is removed from the reactor clarifier and introduced into the flashed crystallization stage. The remainder of the sludge, in a typical facility, is dewatered and disposed as a solid waste.

The amount of waste can be considerable. For example, for a 10 megawatt power plant which requires a brine flow rate of about 1.2 million pounds per hour, more than 6 tons a day of sludge may be produced. Under heretofore known methods for operating a geothermal steam power plant, this sludge includes toxic elements and compounds which, as hereinbefore mentioned, are considered hazardous unless they appear in amounts lower than the standards set by government authorities. As should be appreciated, the costs associated with disposal of toxic sludge can be substantial and are expected to increase as toxic waste dumps become more scarce and/or remotely located.

The clarified brine is pumped into injection wells, but substantial amounts of clarified brine must be returned to the aquifer during operation of a geothermal power plant facility. For example, a 10 megawatt geothermal brine power plant, as hereinbefore mentioned, has a brine flow rate of 1.2 million pounds per hour. Consequently, even small amounts of fine suspended solids in the injected brine not removed by the clarifier can cause the injection wells to plug and thereafter become inoperable or inefficient in disposing of the geothermal power plant effluent. Significant costs are associated with reconditioning of a plugged injection well. For example, as much as a million dollars may be expended in order to recondition a well; hence, it is imperative to reduce the amount of suspended solids in the geothermal power plant effluent to as low a value as possible. When this is accomplished, however, more of these solids removed from the brine must be disposed of.

Typically, to separate fine particles from the spent brine, filters and ponds are used in combination with the clarifier. After the bulk of solid particles is separated and removed as a sludge from the clarifier, the brine is filtered through a set of filters, interconnected in series and/or parallel, which are designed to remove suspended particles from the brine.

Ponding of brine is also a common method of concentrating solids. In this procedure the brine containing fine suspended solids is pumped into large outdoor vats or ponds, and allowed to stand for a time sufficient to allow the fine solids to settle to the bottom of the pond. Thereafter the liquid is skimmed off and the accumulated sludge is dried and sent to toxic waste dumps along with dried sludge from the reactor-clarifier.

The present invention is directed to a method for the production of useable steam from geothermal brine while simultaneously producing a clarified liquid suitable for injection into the aquifer without significant plugging thereof, and solids having toxic elements below those limits defined as hazardous by government agencies such as the State of California. As can be appreciated from the hereinabove discussion with regard to the costs associated with the disposal of toxic wastes, the methods of the present invention provide significant economic benefit. The economic feasibility of recovering useful steam from geothermal brine sources hinges upon operating the plant in an environmentally acceptable manner without the occurrence of costs associated with the handling of toxic materials. These considerations become more important each day as public awareness over the environment hightens and stricter standards continue to be implemented by government agencies in order to regulate the production and disposal of waste considered toxic.

Additional advantages and features of the invention will become apparent to those skilled in the art from the following description when taken in conjunction with the accompanying drawings.

SUMMARY OF THE INVENTION

A method of producing steam from geothermal brine comprising dissolved toxic elements without significant precipitation of toxic solids in accordance with the present invention includes removing geothermal brine comprising water, non-condensable gases, silica and toxic elements from extraction wells drilled into an underground aquifer and removing non-condensable gases from the geothermal brine to produce non-condensable gas-free brine. The non-condensable gases are handled separate from processing of the non-condensable gas-free brine to prevent reaction therebetween with dissolved solids in the non-condensable gas-free brine which can occur at temperatures and pressures less than the temperature and pressure of the geothermal brine as it is removed from the extraction well.

The non-condensable gas-free brine is flashed to produce steam and flashed brine and an air-free flashed brine handling system is established to prevent contact of air with the flashed brine. In this manner, precipitation of solids with a high concentration of toxic elements is eliminated or significantly reduced. The toxic elements prevented from precipitation by the present process includes antimony, arsenic, copper, lead and zinc, among others. Also, in accordance with the present invention, the method produces steam, non-toxic solids and spent brine suitable for aquifer injection. In this instance, the flashed brine is separated into a sludge and clarified brine, with the clarified brine being reinjected into the underground aquifer. The sludge is washed to remove any dissolved toxic elements in order to produce non-toxic solids.

In accordance with the present invention, the non-toxic solids may comprise at most about 500 ppm antimony, about 500 ppm arsenic, about 2500 ppm copper, about 1000 ppm lead and about 5000 ppm zinc. These limits are set by the State of California as the total threshold limit concentration for toxic substances. More particularly, in one embodiment the present invention produces non-toxic solids comprised, at most, about 240 ppm antimony, 123 ppm arsenic, about 1000 ppm copper, about 1000 ppm lead and about 1000 ppm zinc.

When used in conjunction with a power plant, the method of the present invention is suitable for producing power without significant precipitation of toxic solids. The non-condensable gas-free brine is flashed to produce steam and brine, and the steam is utilized to produce power and steam condensate. The steam condensate is injected into the underground aquifer without co-mingling of the steam condensate with non-condensable gas-free brine or the flashed brine to prevent contamination thereof. In this manner, unwanted precipitation of toxic solids is eliminated or substantially reduced. An air-free flashed brine handling system is established to prevent contact of air with the flashed brine, which can result in precipitation of solids having a high concentration of toxic elements.

In order to produce both power and non-toxic solids, while minimizing the number of wells needed to be corrosion-protected, the method in accordance with the present invention includes separating the flashed brine into a sludge and clarified brine, injecting the clarified brine into the underground aquifer separately from the steam condensate, and washing the sludge to produce a non-toxic solid. More particularly, the method of the present invention includes establishing of one or more separate injection wells having casings resistant to corrosion by constituents in the steam condensate, and injecting the steam condensate thereinto. In this manner one is able to produce non-toxic solids and limit the number of injection wells which need to be corrosion-protected.

BRIEF DESCRIPTION OF THE DRAWINGS

The present invention will be more readily understood by reference to the drawings in which:

FIGS. 1a and 1b diagram a hot geothermal brine power generating facility operated in accordance with the present invention.

DESCRIPTION OF THE PREFERRED EMBODIMENT

Figure 1A:
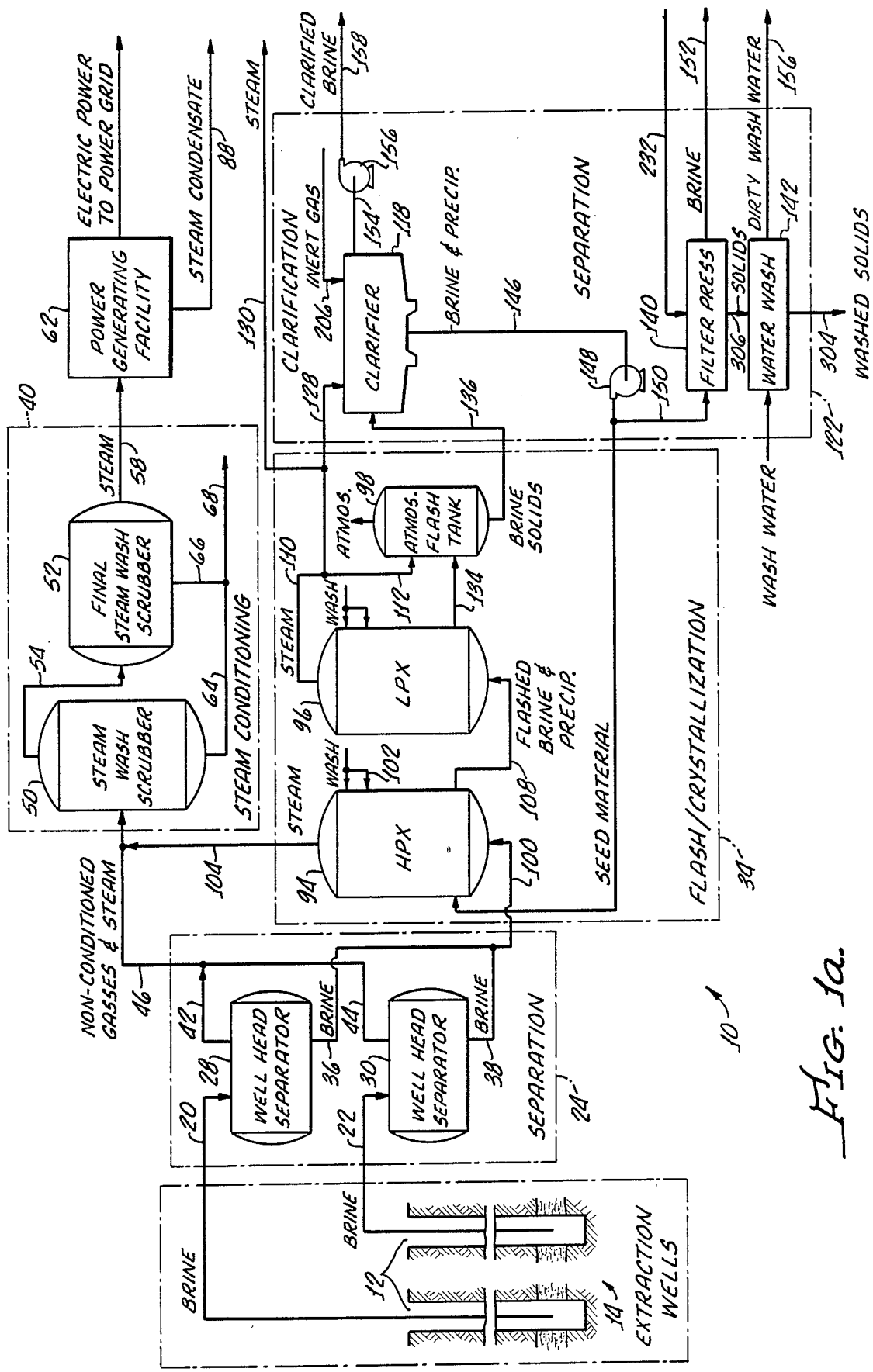

The process of the present invention for producing steam, power and non-toxic solids can be better understood by the consideration of the geothermal brine power plant facility 10, illustrated in FIGS. 1a and 1b in abbreviated block diagrams.

Extraction wells 12 are utilized to remove geothermal brine from an underground aquifer 14. It is to be appreciated that while only two wells 12 have been illustrated in FIG. 1a, a larger number of wells may be used to provide the total input brine requirements of the facility 10. The electrical power generating capability of the facility 10 may vary according to the size of the facility; however, in connection with the description herein provided, the parameters of the facility and the flow rates recited refer to a facility having a 10 megawatt power output. For this power output, the facility 10 requires a total brine flow of about 1.2 million pounds per hour of geothermal brine at a well head temperature of about 500° F. and a pressure of about 450 p.s.i.g.

Extracted brine from the wells 12 typically contains non-condensable gases, silica and toxic elements. To remove the non-condensable gas, the extracted brine is fed through conduits 20 and 22 to a separation stage 24 including wellhead separation vessels 28 and 30. The removed non-condensable gases are handled separately from non-condensable gas-free brine delivered to a flash/crystallization stage 34 via conduits 36, 38 to prevent reaction therebetween with dissolved solids in the non-condensable gas-free brine which can occur at temperatures and pressures less than the temperatures and pressures of the brine as it is removed from the aquifer 14 by the extraction wells 12.

In the wellhead separators some steam escapes with the non-condensable gas. Non-condensable gases and steam delivered to a steam conditioning stage 40 via conduits 42, 44, 46 enters a steam wash scrubber 50.

In addition to the steam wash scrubber 50, the steam conditioning stage 40 includes a final steam wash scrubber 52 interconnected therewith via conduit 54. Steam passes through the steam wash scrubber 50 and final steam wash scrubber 52 through an exit conduit 58 to a conventional power generating facility 62 for subsequent generation of electrical power. Water from the scrubbers 50, 52 exits via conduits 64, 66 and thereafter passes through a discharge conduit 68 to a diffuser sump settling tank 80 (FIG. 1b). Since this water has been contacted with air, the present invention provides for its separate handling and importantly separate injection into the aquifer 14, as hereinafter described.

The power generating facility 62 produces about 200,000 pounds of condensate per hour, which corresponds to the extraction rate in excess of about 1.0 million pounds per hour of brine from the extraction wells 12. While lower and higher brine flow rates may be handled, the present invention has best advantage at higher brine flow rates for commercial utilization of the brine. Discharge of the condensate is through a conduit 88 to a condensate holding stage 90 and thereafter into the aquifer 14 via a separate injection well with other aerated brine as will be hereinafter described.

Continuing with a description of the facility 10, the flash crystallization stage 34 includes a high pressure flash crystallizer 94, a low pressure crystallizer 96, and an atmospheric flash tank 98. Brine is introduced into the high pressure flash crystallizer 94 from the wellhead separators 28, 30 via conduit 36, 38 and the conduit 100 where it is subjected to an operating pressure of about 100 p.s.i.g. At this reduced pressure, the brine instantly flashes, or boils, releasing useful steam and producing brine supersaturated with dissolved solids including silica. Before leaving the high pressure crystallizer, the steam generated therein is subjected to a steam washing system 102 to reduce the amount of impurities therein and thereafter fed through a steam conduit 104 for introduction into the steam conditioning stage 40 via conduit 46.

Flashed brine from the high pressure flash crystallizer 94 (FIG. 1a) is fed through a conduit 108, to the low pressure flash crystallizer 96 which is usually operated at a pressure between atmospheric and about 50 p.s.i.g. At this point, additional steam is flashed from the brine, and such steam is fed through conduits 110, 112 to the atmospheric flash tank 98 at which point it is discharged into the atmosphere. Alternatively, the steam released in the low pressure flash crystallizer 96 may be used for heating or other energy-related purposes within the geothermal power facility 10 and for blanketing clarifiers 118, 120 in a primary clarification stage 122 and secondary clarification stage 124, respectively, steam being provided thereto by conduits 128, 130, respectively. Flashed brine from the low pressure crystallizer 96 is fed via a conduit 134 into the atmospheric flash tank 98. Brine, including suspended solids with silica precipitate therein from the atmospheric flash tank 98, is transported through a conduit 136 to the separation stage 122 which includes the clarifier 118, a filter press 140 and a water wash 142.

A portion of sludge from the clarifier 118, is fed via a conduit 146 and pump 148 back into the high pressure flash crystallizer 94 to act as seed material. The remainder of the sludge is sent to the filter press 140 by a conduit 150 to remove excess liquids. Thereafter, the solids are washed to remove any remaining dissolved toxic solids to produce a non-toxic solids suitable for use as a building material, when combined with cement, soil conditioner or other uses. In accordance with the present invention, wash water containing dissolved toxic solids is sent to a settling pond and thereafter separately disposed of with other oxygen containing brine as will be hereinafter described. Brine from the filter press is conveyed via a conduit 152 to be combined with steam condensate and separately injected into the aquifer 14 as hereinafter described.

Clarified geothermal brine is discharged from the clarifier 118 through a brine conduit 154, pump 156 and conduit 158 into the secondary clarifier 120 in the secondary clarification stage 124. (FIG. 1b).

Generally comprising the secondary brine clarification stage 124 is the closed, secondary clarification vessel 120, a flocculating agent tank 160, a relatively small, high flow rate emergency filter 162 and a filter backwash brine holding tank 164 as well as pumps 168, 170, 172, 174 and 176. The secondary clarifier vessel 120 may be of a metallurgical reactor type which is formed having a large internal reaction well 180 with rotatably driven mixing blades 182 mounted on a vertical shaft 184 therein. Rotatably driven scraper blades 186 are provided below a partially open bottom 188 of reaction well 180.

Clarified brine overflow from the clarifier 118 is flowed, through conduit 154, and pump 156, conduit 158, into upper regions 196 of the secondary clarifier reaction well 180. Steam may be flowed from low pressure flash crystallizer 96, through conduits 110, 130 into the top of secondary clarifier vessel 120 to provide a steam blanket 200 over a brine surface 202 in the vessel 120 and to exclude air from the vessel, as it is considered important to avoid increased brine acidification caused by air oxidation of ferrous ions naturally present in the brine to ferric ions, as well as reduce the production of toxic elements. Alternatively, inert gas may be used to blanket the brine in both the clarifier 118, 120 as indicated by arrow 206 in FIG. 1a.

A flocculating agent may be fed by pump 168 through conduits 208 and 210 from flocculating agent tank 160 into brine effluent conduit 158. Within conduit 158, the flocculating agent is inter-mixed with the clarified brine before the brine is discharged into secondary clarifier vessel 120.

Within secondary clarifier vessel 120, the inflowing brine is naturally circulated down and around reaction well 180 (direction of Arrows A and B, FIG. 2a), while at the same time mixing blades 182 are rotated so as to provide good brine-flocculating agent contact within the reaction well.

The secondary clarified brine overflow from vessel 120 is discharged through an overflow conduit 216 to injection pump 218. Preferably, the solids content of the secondary clarified brine overflow is less than about 20 parts per million, with mean particle size being between about 3 and about 4 microns. Within vessel 120, the settling solids are raked by means 186 to a solids-brine discharge conduit 220 located at the bottom 222 of the vessel.

A portion of the solids-brine underflow from secondary clarifier vessel 120 is recirculated to the inlet 224 of the vessel at a rate maintaining the solids concentration in reaction well 180 within a particular weight percent range. This particular weight percent range is preferably between about 0.5 and about 3 weight percent, with the more preferred weight percent being about 1.5 percent.

Pump 172 is connected to discharge conduit 220 for pumping some of the solids-brine slurry or sludge from vessel 120, through a conduit 228, to brine inlet 224. The rest of the slurry from vessel 322 is pumped by pump 172, through conduits 230, 232, to the filter press 140. Valves 234 and 236 in respective conduits control the division of sludge pumped by pump 172 between brine inlet 224 of the clarifier 120 and filter press 140.

Should the concentration of residual solids suspended in the brine overflow from secondary clarifier vessel 120 unexpectedly exceed safe or allowable reinjection limits, the brine overflow from the vessel may be temporarily diverted, through a conduit 240, to pump 174 which then pumps the brine through a conduit 242 into emergency filter 162. After passing through filter 162, the brine is flowed through a conduit 244 back into conduit 216 leading to injection pump 218. Valves 248, 250 and 252 enable the brine overflow from secondary clarifier vessel 120 to be diverted around (as is the usual case), or alternatively to be flowed through, emergency filter 162. It is to be appreciated that brine overflow from secondary clarifier vessel 120 is flowed through filter 162 only until normal secondary clarification of the brine is reestablished in vessel 120.

Associated with filter 162 is a backwash holding tank 164, which receives brine overflow from vessel 120 through a conduit 254 connected to brine conduit 216. Valve 258 in conduit 216 downstream of conduit 254 and a valve 260 in conduit 254 enable the diverting of brine from injection pump 218 into holding tank 164. To enable filter backwashing, backwash pump 176 pumps brine from holding tank 164 through conduits 264 and 266, as well as through control valve 270 to filter outlet conduit 244 upstream of valve 252.

The process of the present invention utilizes a unique injection stage 276 for returning fluids to the aquifer 14 and includes a plurality of conventional injection wells 278 and at least one spaced apart designated injection well 280 for the acceptance of aerated brine, that is, oxygen containing aqueous liquids produced by the process such as the steam condensate, water from the steam wash scrubber, filter press brine, dirty wash water all of which contain dissolved, corrosive constituents and/or toxic elements. While otherwise conventional in nature, the designated injection well 280 preferably includes corrosion resistant casings, selected with the consideration that the brine injected thereinto is cooler than that injected into the conventional injection wells 278, while at the same time having a relatively high oxygen content.

Because a separate injection well 280 is used to receive aerated brine, the majority of injection wells 278 handling non-aerated brine do not have to be provided with corrosion resistant casings. This has significant economic advantage since it is expected that the designated injection well 280 will take less than ten percent, usually less than five percent and preferably less than about three percent, of the total brine injected into the aquifer 14. In addition, separated injection of aerated and non-aerated brine prevents plugging of the injection well due to precipitation of solids which occurs as a result of mixing of the aerated, non-aerated brines.

The handling of the aerated brine separate from the flash crystallizer stage 34 which produces useable steam for the power generating facility 62 is of utmost importance. Heretofore, steam condensate from the power generating facility 62 has been processed to remove solids therein and returned to the general brine handling system via the low pressure crystallizer or the atmospheric flash tank in order to conserve enthalpy. However, it has been found that comingling of brine which has been exposed to oxygen, or aerated, causes undesirable precipitation of dissolved toxic solids. Hence, in accordance with the present invention, the steam condensate is disposed of by storing it in a conditioning, or settling, tank 90, and thereafter separately injected with other oxygen-containing streams into the designated injection well via conduits 288, 290 and pump 292.

As hereinabove mentioned, the aerated brine produced in the process such as water from the steam scrubbers 50, 52, dirty wash water from the water wash stage 142, and emergency steam release, if any, from relief valves (not shown) within the facility are delivered to a diffuser-settler 80 by conduits 68, 156, 296, respectively, and thereafter combined with other oxygen-containing streams and injected into the designated injection well by a conduit 300, pump 292 and conduit 290. Additionally, steam which may be diverted from the steam blanketing line 130 may be diverted by a conduit 302 into the diffuser-settling tank wherein it is cooled, condensed and thereafter injected into the designated injection well.

Brine from filter press 140 is combined with steam condensate in the brine/conditioning storage tanks via line 152 and subsequently disposed of into the designated injection well 280.

The present invention may be further described with reference to the following example:

EXAMPLE

When the facility 10 hereinabove described is operated at steady state conditions, a sample of solids is taken from conduit 306 exiting the filter press 140 and another sample is taken from the washed solids removed from outlet 304 from the water wash 142. These samples are dried, and the moisture and water-soluble and water-insoluble contents of the settled sludge are calculated from the weight losses of the two samples. The dry, washed sludge is given a Waste Extraction Test (WET) in accordance with the California Assessment Manual (CAM) a full description of the test being set forth therein. The WET results of the washed sludge are shown in Table 1. As can be seen, all of the toxic elements are below the Soluble Threshold Limit Concentrations (STLC) requirements of the CAM.

The characterization results of the washed sludge and the comparison of its analysis with the Total Threshold Limit Concentrations (TTLC) stated in the CAM are shown in Table 2. It is found that under the procedures set forth in the present invention that the concentration of toxic elements are below in Total Threshold Limit Concentrations set forth in the CAM.

TABLE 1

| RESULTS OF WASTE EXTRACTION TEST ON SLUDGE | | |
|---|---|---|
| ELEMENT | SOLUTION ANALYSIS (mg/l) | STLC (mg/l) |
| As | 1.1 | 5 |
| Ba | 23.0 | 100 |
| Be | 0.1 | 0.75 |
| Cd | <0.1 | 1 |
| Co | <0.2 | 80 |
| Cr | <0.1 | 5 |
| Cu | 0.2 | 25 |
| F | 10.2 | 180 |
| Hg | 0.005 | 0.2 |
| Mo | <0.3 | 350 |
| Ni | <0.2 | 20 |
| Pb | 2.2 | 5 |
| Sb | <0.5 | 15 |
| Se | <0.01 | 1 |
| Tl | <0.4 | 7 |
| Ag | <0.1 | 5 |
| V | <0.1 | 24 |
| Zn | 2.2 | 250 |

TABLE 2

| ANALYSIS OF SLUDGE | | |
|---|---|---|
| SETTLED SLUDGE: | Moisture 18% Water soluble 11% Water insoluble 71% | |
| WATER INSOLUBLE: | Average particle size (Coulter) 14 um | |
| X-RAY DIFFRACTION: | MAJOR: Barite with minor cation substitution TRACE: Fluorite | |
| ELEMENT | ANALYSIS(ppm) | TTLC(ppm) |
| Sb | 240 | 500 |
| As | 123 | 500 |
| Ba | 109,000 | 10,000* |
| Be | 36 | 75 |

TABLE 2-continued

| ANALYSIS OF SLUDGE | | |
|---|---|---|
| Cd | <10 | 100 |
| Cr | <9 | 500 |
| Ca | <20 | 8,000 |
| Cu | <1,000 | 2,500 |
| F | 13,000 | 18,000 |
| Hg | <0.1 | 20 |
| Mo | <30 | 3,500 |
| Ni | <20 | 2,000 |
| Pb | <1,000 | 1,000 |
| Ag | 117 | 500 |
| V | <9 | 2,400 |
| Zn | <1,000 | 5,000 |
| Al | <1,000 | |
| Fe | 62,000 | |
| Si | 259,000 | |
| Mn | 2,880 | |
| Co | 18,300 | |
| Sr | 6,800 | |
| CO3 | <150 | |
| Cl | 2,510 | |
| Total Solids | 34,000 | |

*Excluding Barite

Removing non-condensable gases by wellhead separators 230, keeping aerated and non-aerated brine streams separate from one another within the facility, blanketing the brine in the clarifier and secondary clarification stage 124 with steam or inert gas, and washing the solids to remove dissolved toxic elements has been found to produce a sludge having low concentrations of toxic elements. It has also been found that when the use of wellhead separators to remove non-condensable gases is discontinued, copper concentrations in the washed solids exceed the CAM standards set forth in Table 2. In explanation of this, it is theorized that the non-condensable gases, if not removed by the separators, react with the dissolved solids in the brine at lower temperatures and pressures and that this reaction occurs in the high pressure crystallizer resulting in precipitation of a copper compound. The wellhead separator reduces the time and increases the pressure and temperature during which the gas/brine mixture can react. As shown in Table 2, when non-condensable gases are removed, the copper concentrations are below the CAM limits.

Although a particular embodiment of the invention has been described, it will, of course, be understood that the invention is not limited thereto, since many obvious modifications can be made, and it is intended to include within this invention any such modifications as fall within the scope of the appended claims.

What is claimed is:

1. A method of producing steam from geothermal brine comprising dissolved toxic elements without significant precipitation of toxic solids, said method comprising:

removing geothermal brine comprising water, non-condensable gases and toxic elements from an extraction well drilled into an underground aquifer;

removing non-condensable gases from the geothermal brine to produce non-condensable gas-free brine and maintaining the non-condensable gases separate from the non-condensable gas-free brine to prevent reaction therebetween with dissolved solids in the non-condensable gas-free brine;

flashing the non-condensable gas-free brine to produce steam and flashed brine; and introducing the flashed brine into an air-free handling system to prevent contact of air with the flashed brine.

2. The method according to claim 1 wherein the toxic elements comprise antimony, arsenic, copper, lead and zinc.

3. A method of producing steam, non-toxic solids and spent brine suitable for aquifer injection using a geothermal brine aquifer, said method comprising:
removing geothermal brine comprising water, non-condensable gases and toxic elements from extraction wells drilled into a geothermal brine aquifer;
removing non-condensable gases from the geothermal brine to produce non-condensable gas-free brine and maintaining the non-condensable gases separate from the non-condensable gas-free brine to prevent reaction with dissolved solids in the non-condensable gas-free brine;
flashing the non-condensable gas-free brine to produce steam and flashed brine;
introducing the flashed brine into an air-free handling system to prevent contact of air with the flashed brine;
separating the flashed brine into a sludge and clarified brine;
injecting said clarified brine into the underground aquifer; and
washing and drying the sludge to produce non-toxic solids.

4. The method according to claim 3 wherein said toxic elements comprise antimony, arsenic, copper, lead and zinc.

5. The method according to claim 3 wherein said non-toxic solids comprise at most about 500 ppm antimony, about 500 ppm arsenic, about 2500 ppm copper, about 1000 ppm lead and about 5000 ppm zinc.

6. The method according to claim 3 wherein said non-toxic solids comprise to most about 240 ppm antimony, about 123 ppm arsenic, about 1000 ppm copper, about 1000 ppm lead and about 1000 ppm zinc.

7. A method of operating a geothermal brine power plant for producing power without significant precipitation of toxic solids, said method comprising:
removing geothermal brine comprising water, non-condensable gases and toxic elements from extraction wells drilled into an underground aquifer;
removing non-condensable gases from the geothermal brine to produce non-condensable gas-free brine and maintaining the non-condensable gases separate from the non-condensable gas-free brine to prevent reaction therebetween with dissolved solids in the non-condensable gas-free brine;
flashing the non-condensable gas-free brine to produce steam and flashed brine;
generating power with the steam and producing steam condensate;
injecting the steam condensate into the underground aquifer without comingling of the steam condensate with the non-condensable gas-free brine or the flashed brine to prevent contamination thereof; and
introducing the flashed brine into an air-free handling system to prevent contact of air with the flashed brine.

8. The method according to claim 7 wherein the toxic elements comprise antimony, arsenic, copper, lead and zinc.

9. The method according to claim 8 further comprising injecting the steam condensate into a separated injection well having casings resistant to corrosion.

10. A method of operating a geothermal brine power plant for producing power and a non-toxic solid efflux from geothermal brine comprising dissolved toxic elements, said method comprising:
removing geothermal brine comprising water, non-condensable gases and toxic elements from extraction wells drilled into an underground aquifer;
removing non-condensable gases from the geothermal brine to produce non-condensable gas-free brine and maintaining the non-condensable gases separate from the non-condensable gas-free brine to prevent reaction therebetween with dissolved solids in the non-condensable gas-free brine;
flashing the non-condensable gas-free brine to produce steam and flashed brine;
generating power with the steam and producing steam condensate;
injecting the steam condensate into the underground aquifer without comingling of the steam condensate with the non-condensable gas-free brine or the flashed brine to prevent contamination thereof;
introducing the flashed brine into an air-free handling system to prevent contact of air with the flashed brine;
separating the flashed brine into a sludge and clarified brine;
injecting said clarified brine into the underground aquifer separately from said steam condensate;
washing and drying the sludge to produce non-toxic solids.

11. The method according to claim 10 further comprising injecting the steam condensate into a separated injection well having casings resistant to corrosion.

12. The method according to claim 10 wherein said toxic elements comprise antimony, arsenic, copper, lead and zinc.

13. The method according to claim 10 wherein said non-toxic solids comprise at most about 500 ppm antimony, about 500 ppm arsenic, about 2500 ppm copper, about 1000 ppm lead and about 5000 ppm zinc.

14. The method according to claim 10 wherein said non-toxic solids comprise at most about 240 ppm antimony, about 123 ppm arsenic, about 1000 ppm copper, about 1000 ppm lead and about 1000 ppm zinc.

15. The method according to claim 14 wherein the amount of geothermal brine removed from the extraction wells is greater than about one million pounds per hour.

16. The method according to claim 14 wherein the amount of geothermal brine removed from the extraction wells is greater than about four million pounds per hour.

* * * * *